United States Patent [19]

Hatamura

[11] Patent Number: 4,485,681
[45] Date of Patent: Dec. 4, 1984

[54] THRUST-TORQUE DETECTOR

[76] Inventor: Yotaro Hatamura, 2-12-11 Kohinata, Bunkyo-ku, Tokyo, Japan

[21] Appl. No.: 433,108

[22] Filed: Oct. 6, 1982

[30] Foreign Application Priority Data

Nov. 24, 1981 [JP] Japan .................. 56-188125

[51] Int. Cl.³ .............................. G01L 5/16
[52] U.S. Cl. .................. 73/862.04; 73/862.06
[58] Field of Search .......... 73/862.04, 862.05, 862.06, 73/862.49, 862.65, 147; 308/2 A

[56] References Cited

U.S. PATENT DOCUMENTS

| 3,473,760 | 10/1969 | Vaiden | 73/862.05 X |
| 3,956,930 | 5/1976 | Shoberg | 73/862.49 X |
| 4,074,567 | 2/1978 | Horanoff | 73/147 |

FOREIGN PATENT DOCUMENTS

| 0216325 | 4/1968 | U.S.S.R. | 73/862.06 |
| 0579548 | 11/1977 | U.S.S.R. | 73/862.04 |
| 0714187 | 2/1980 | U.S.S.R. | 73/862.04 |

Primary Examiner—Charles A. Ruehl
Attorney, Agent, or Firm—Wenderoth, Lind & Ponack

[57] ABSTRACT

A thrust-torque detector comprising a tubular member. The tubular member has parallel spring-like elastically supported structural portions deformable by a thrust and positioned opposite each other. The tubular member has radially arranged spring-like elastically-supported structural portions deformable by a torque and positioned opposite each other.

8 Claims, 16 Drawing Figures

FIG. 1-A
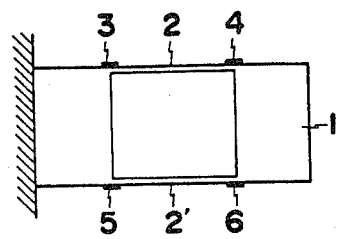
FIG. 1-C
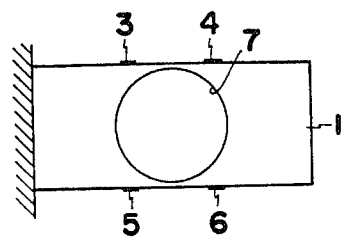
FIG. 1-B
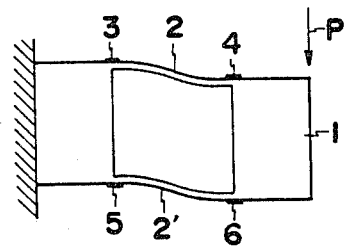
FIG. 1-D
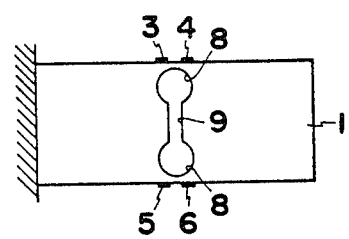
FIG. 2
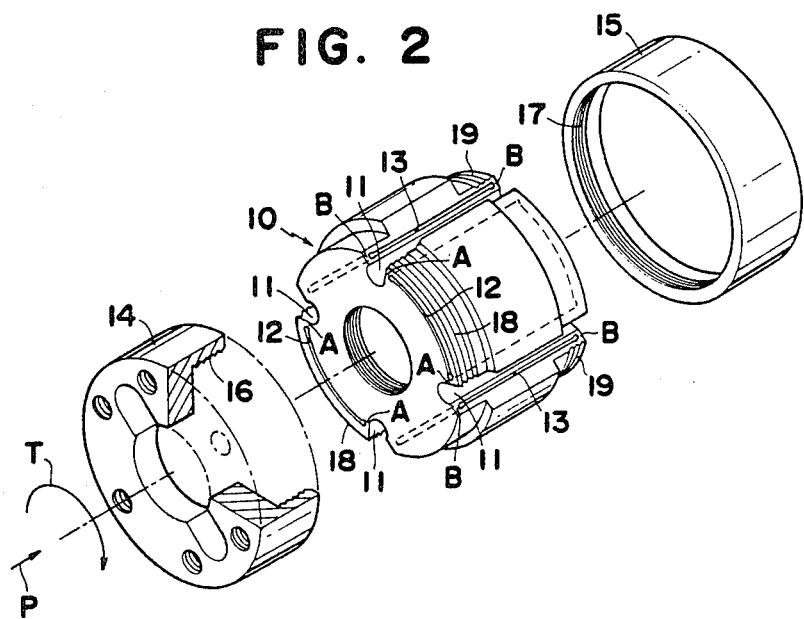

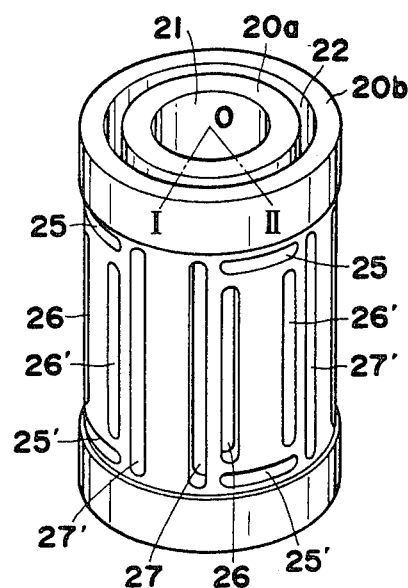
FIG. 3
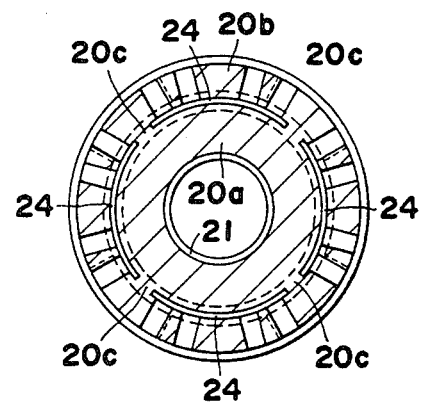
FIG. 4-B
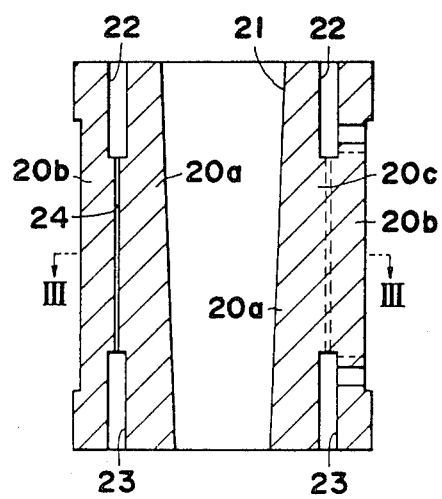
FIG. 4-A
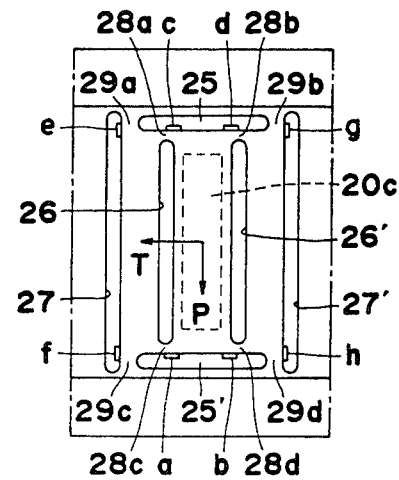
FIG. 4-C

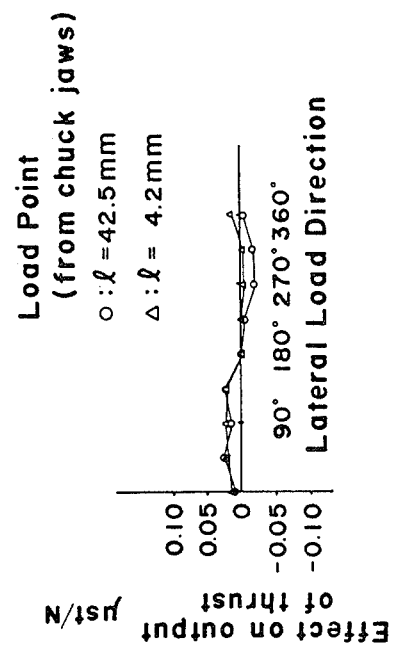
FIG. 7-A
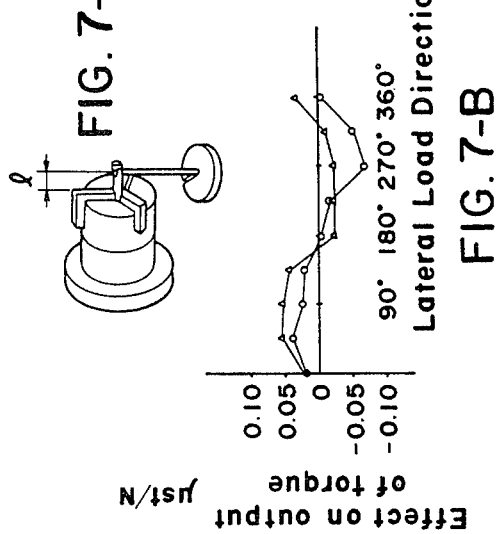
FIG. 7-C
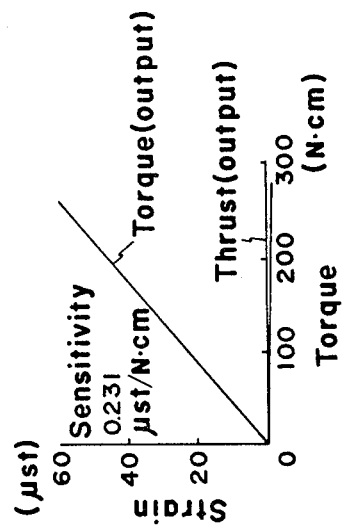
FIG. 7-B
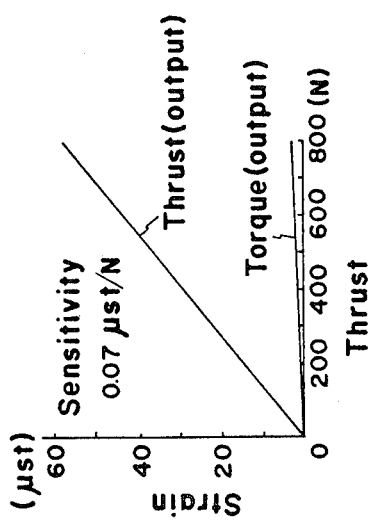
FIG. 5
FIG. 6

FIG. 8-A
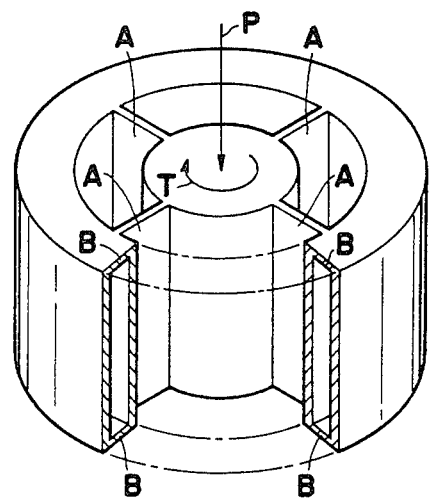
FIG. 8-B
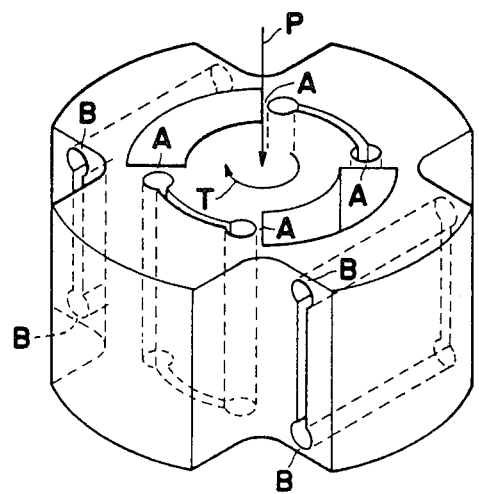

THRUST-TORQUE DETECTOR

BACKGROUND OF THE INVENTION

The present invention relates in general to a thrust-torque detector, and more particularly to an element or device which is fitted to a rotating shaft of a rotational machine such as machine tools, though not limited thereto, to detect the thrust and/or torque applied to the rotating shaft.

One application for such a thrust-torque detector is a cutting dynamometer measuring cutting resistance, and various designs of cutting dynamometers have so far been made. However, there is still room for improvement in these designs to make the cutting dynamometer applicable to such a machine as a large-sized drilling machine and to meet the basic requirements that it has a large gain, that the mutual interference is minimal when a force is divided into two components to be measured, that the measurement has linearity without hysteresis, that there is little effect on the output even when the point of application is changed, and that the frequency characteristics are fixed within a required range, etc. Such a detector is indispensable to give a self-diagnosis function to machine tools required, for instance, to have a high level of automation thereof.

SUMMARY OF THE INVENTION

A principal object of the present invention is to provide a novel thrust-torque detector of a type that can be fitted to a rotating shaft, which meets with the above requirements comprehensively.

Another object of the present invention is to provide an improved thrust-torque detector.

A further object of the present invention is to provide a new thrust-torque detector which is applicable to such a machine as a large-sized drilling machine.

A further object of the present invention is to provide a thrust-torque detector which can provide a large gain.

Another object of the present invention is to provide a thrust-torque detector, in which a mutual interference is minimum when a force is divided into two components to be measured.

An additional object of the present invention is to provide a thrust-torque detector, which can provide in measurement a linearity without hysteresis.

A further object of the present invention is to provide a thrust-torque detector, whose output is minimally effected when the application point is changed.

Another object of the present invention is to provide a new thrust-torque detector, by which frequency characteristics are fixed or constant within a required range.

Yet a further object of the present invention is to provide a thrust-torque detector which permits a high-level automatization of a machine tool.

Briefly, a thrust-torque detector according to the present invention has parallel spring-like elastically supported structural portions deformable by a thrust positioned opposite each other, and radially arranged spring-like elastically-supported structural portions deformable by a torque positioned opposite each other, in the tube portion of a tubular member.

Two kinds of detecting elements having different functions may be arranged alternately and circumferentially on the tubular member.

Two kinds of detecting elements having different functions may be arranged alternately and circumferentially on the tubular member.

The tubular member may be divided into four parts by four longitudinal dividing grooves provided at equal intervals. Slits are formed in the circumferential direction and opening at the upper and lower ends of the tubular member, and other slits are formed in the longitudinal direction to open onto the side surfaces to the right and left of the longitudinal dividing grooves. Preferably, the spring-like elastically-supported structural portions for torque detection are provided in two opposite sides of the tubular member, such that these structural portions are arranged radially at both ends of the first-mentioned slits, while the structural portions for thrust detection are disposed in the remaining two opposite sides of the tubular members, such that the structural portions for thrust detection are formed at both ends of the said other slits.

A tapered hole in which a tool is fitted may be provided inside the tubular member so that at least one of the thrust and torque to be detected is transmitted from the inside of the tubular member to the outside thereof. Preferably, the tubular member is formed by providing an inner sleeve portion, an outer sleeve portion and connecting portions.

In this structure, the tapered hole is formed in the inner sleeve portion, which is constructed integrally with the outer sleeve portion connected by the connecting members arranged at 90 degree intervals. The connecting members can be formed by forming circular grooves on the upper and lower ends of the tubular member and by forming arc-shaped slits. The arc-shaped slits can be formed by wire cuts to connect the two circular grooves together.

The torque detection elements and the thrust detection elements may be arranged concentrically. In this instance, it is preferred that the structural portions for torque detection, which are arranged radially, are formed of plates which extend in the radial direction.

BRIEF DESCRIPTION OF THE DRAWINGS

FIGS. 1-A to 1-D are schematic drawings explaining the principles of the present invention.

FIG. 2 is an exploded perspective view illustrating a first embodiment of the present invention.

FIG. 3 is a perspective view illustrating a second embodiment of the present invention; FIG. 4-A is a sectional view taken along the I-O-II lines in FIG. 3.

FIG. 4-B is a sectional view obtained by cutting along the III-III line in FIG. 4-A and seen in the direction of the arrows. FIG 4-C is a plan view of a single slot pattern in the second embodiment of the present invention.

FIGS. 5 and 6 respectively illustrate a test curve of thrust, and a test curve of torque in the first embodiment. In particular FIGS. 5 and 6 show a thrust calibration curve and a torque calibration curve, respectively.

FIGS. 7-A and 7-B are graphs of test results respectively showing the effects of a lateral load on the thrust output and the effects of a lateral load on the torque output in the first embodiment of the invention. FIG. 7-C illustrates the point at which the lateral load is applied.

FIGS. 8-A and 8-B are perspective views of further embodiments of the thrust-torque detector according to the present invention.

DETAILED DESCRIPTION OF PREFERRED EMBODIMENTS

The present invention will be fully described with reference to preferred embodiments thereof.

The inventor of the present invention has found the following from the results of studies made so far. When a cantilevered member 1 formed of a square bar with a square hole made in the side thereof to form two parallel thin members 2 and 2' as shown in FIG. 1-A so as to obtain a structure having elasticity only in one direction and a sufficient rigidity in the other two directions is deflected by a lateral load P as shown in FIG. 1-B, whereby strain gauges 3 and 6 attached to the roots of the thin members 2 and 2' respectively are subjected to tensile strain, while strain gauges 4 and 5 similarly attached are subjected to compressive strain, these four strain gauges, when combined in a bridge, make it possible to obtain an output signal proportional to P.

An elastically supported structure formed of such parallel thin members has a very large gain since it utilizes the strain caused basically by the bending of the thin members and, in addition, can be made into a load cell with very little interference since it has a large rigidity against forces perpendicular to P. Fluctuations of the output of such a load cell due to changes in the point at which the force is applied can be made small by increasing the distance between, or the width of, the thin members 2 and 2'. A structure other than that of the thin members 2 and 2' can be adopted provided that it is a parallel spring-like elastically supported structure, and thus a round hole 7 as shown in FIG. 1-C may be utilized in place of the square hole in FIG. 1-A, or the hole can be made in any shape such as one in which two small round holes 8, are connected by a slit 9 as shown in FIG. 1-D, when it is desirable to provide a large distance between the two thin members 2 and 2', and the hole thus shaped has the same characteristics as that of the basic type shown in FIG. 1-A.

The present invention is designed to embody the above basic principles in a thrust-torque detector of a type that can be fitted to a rotating shaft. The following is a detailed description of the present invention based on some embodiments shown in the attached drawings.

The first embodiment shown in FIG. 2 is an example wherein two kinds of detecting elements having different functions are arranged alternately and circumferentially in such a manner that a thrust-detecting element, a torque-detecting element, another thrust-detecting element and another torque-detecting element are arranged sequentially around the circumference of a tubular member 10. The tubular member 10 is divided into four parts by four longitudinal dividing grooves 11 provided at 90 degree intervals, and spring-like elastically-supported structural members or portions A for detecting torque are provided in two opposite sides of the tubular members. These members A are arranged radially at both ends of slits 12 made in the circumferential direction and opening at the upper and lower ends of the tubular member 10, while parallel spring-like elastically-supported structural members or portions B for detecting thrust are provided in the remaining two opposite sides of the tubular members. These members B are formed at both ends of slits 13 made in the longitudinal direction to open onto the side surfaces to the right and left of the longitudinal dividing grooves 11. Flanges 14 and 15 are screwed to the upper and lower end parts of the tubular member 10 respectively as follows: An internal thread 16 is provided in the flange 14 and a screw thread 18 to engage with the internal thread 16 is provided only on the upper side surfaces of the torque-detecting elements, while there is no such screw thread on the upper side surfaces of the thrust-detecting elements. At the other end, a screw thread 19 to engage with an internal thread 17 of the flange 15 is provided only on the lower side surfaces of the thrust-detecting elements, while there is no such screw thread on the lower side surfaces of the torque-detecting elements. It is desirable that the areas wherein the screw thread engage with each other are later fixed firmly by, for example, welding. The flange 15 is fixed to a rotating shaft, such as, for instance, the main shaft of a machine tool.

When a torque shown by an arrow T and a thrust shown by an arrow P are applied to the flange 14 positioned opposite to the flange 15 fixed to the rotating shaft, the torque T is transmitted to those of the elastically-supported structural members A of the torque-detecting elements positioned outside the slits 12, through the screw threads 16 and 18, whereby strain is generated between these members and the members thereof positioned inside the slits. Meanwhile, the thrust P is transmitted to those of the elastically-supported structural members B of the thrust-detecting element positioned inside the slits 13, via the inner part of the tubular member 10 and thereby strain is generated between these members and the member positioned outside the slits, which are supported by the fixed screw threads 19 and 17. Either of these groups of strains can be detected as an electric signal by the application of means similar to the strain gauges 3 or 6 shown in FIG. 1-D, and it is also possible, of course, to detect them by utilizing the principle of a potentiometer, a differential transformer or a magnetic encoder, or by piezoelectric elements.

As one means for producing the electric signals using no contacts, not shown in the drawing, two sets of strain amplifiers and FM transmitters and a cell to provide power thereof can be built into a holder which is made to fit on the inside of the tubular member 10, while the high-frequency outputs of the FM transmitters are led to two antennas wound around the outer periphery of the flange 15 for transmission.

The second embodiment shown in FIG. 3 differs from the first embodiment in that a tapered hole 21 in which a tool is fitted is provided inside the tubular member 20 so that both the thrust P and torque T to be detected are transmitted from the inside of the tubular member 20 to the outside thereof while both are transmitted from the front to the rear of the member in the first embodiment. This tubular member 20 is formed by having an inner sleeve member 20a, wherein the tapered hole 21 is formed, constructed in one piece with an outer sleeve member 20b connected by connecting members 20c arranged at intervals of 90 degrees, while the connecting members 20c can be formed by circular grooves 22 and 23 provided on the upper and lower ends of the tubular member 20 and by four circular-arc slits 24 formed by wire cuts to communicate those two circular grooves 22 and 23 with each other, as illustrated in FIG. 4-A and FIG. 4-B. The outer sleeve members 20b is formed with four separate slot patterns, as shown in FIG. 4-C, provided continuously in the circumferential direction so that each slot pattern includes horizontal slots 25 and 25' respectively above and below connecting member 20, and first vertical slots 26 and 26' and second vertical slots 27 and 27' to the right and left of each connecting member 20c, in pairs, respectively. This structure defines the parallel flat-plate-shaped elastically-supported structural members 28a, 28b, 28c and 28d for detecting thrust and the spring-like elastically-suported structural members 29a, 29b, 29c and 29d for detecting torque, positioned around each connecting member 20c. That is, in the second embodiment, the thrust-detecting elements and the torque-detecting elements are formed together in a single slot pattern, and when the thrust P and the torque T are applied to the inner sleeve members 20a and transmitted to the outer sleeve member 20b through the connecting members 20c, the thrust P generates tensile strain in the strain gauges a and b and compressive strain in the strain gauges c and d, while the torque T generates tensile strain in the strain gauges e and f and compressive strain in the strain gauges g and h. As can be seen in FIGS. 3 - 4-C, in the second embodiment, like the first, the longitudinal extent of the overall patterns of torque detection structural members is fully within the longitudinal extent of the overall pattern of thrust detection structural members.

Further embodiments illustrated in FIG. 8-A and FIG. 8-B differ from the other embodiments in that the torque-detecting elements and the thrust-detecting elements are arranged concentrically and especially in that, in the embodiment shown in FIG. 8-A, the spring-like elastically-supported structural members A which are deformed by a torque T and are arranged radially are composed of plate-shaped members extending in the radial direction. The other structure and functions thereof will be understood from the foregoing description and from the drawings, and a further description will not be made for reasons of simplification only.

The following is the results of experiments conducted on the detector of the first embodiment so as to confirm the effects given by its constitution offered by the present invention. A test curve formed when thrust is applied is as shown in FIG. 5, indicating excellent linearity and hysteresis characteristics and that the interference of torque with thrust is about 4%. A test curve formed when torque is applied is as shown in FIG. 6, also indicating excellent linearity and hysteresis characteristics and that the interference of thrust with torque is about 1% in this case. The experiment shows that almost no variation is caused in the effects by a shift in a point at which the torque is applied. FIGS. 7-B and 7-C show the result of an investigation of the effect of a lateral load on the respective outputs of the thrust-detecting and torque-detecting elements, indicating the amount of interference with the each output for a unit lateral load by the amount of strain. In FIGS. 7-A and 7-B, the horizontal axis indicates the direction (angle) of the action of the lateral load with the distance shown in FIG. 7-C from the ends of the jaws of a chuck to the load point of a weight as the parameter. The amount of interference in this case varies according to the point at which the lateral load is applied and to the direction of the action thereof. For instance, when a lateral load of 10 N perpendicular to the main shaft acts on a point 42.5 mm from the end of the chuck, the maximum strain caused in the thrust-detecting elements and the torque-detecting elements by the rotation of the main shaft is only about 10 N×0.025 μst/N=0.25 μst and 10 N×0.06 μst/N=0.6 μst, respectively. Since it enables a very precise measurement of thrust and torque in this way, the present invention provides an extremely large advantage in enabling the realization of a desired system of optimum control or trouble-monitoring by the use of the output of the device offered thereby.

Although the present invention has been described with reference to the preferred embodiments thereof, many modifications and alterations can be made within the spirit of the invention. For instance, the tubular member 10 may be cylindrical (solid or hollowed), conical, or selected from any other suitable shapes such as a pyramid.

What is claimed is:

1. A thrust-torque detector, comprising:
a tubular member having a longitudinally extending central axis, opposite end surfaces, and a central longitudinally extending opening, said tubular member including:
a first set of parallel first spring-like elastically supported structural portions which are deformable by an axial thrust force and positioned opposite each other, and
a second set of radially extending second spring-like elastically supported structural portions which are deformable by a torque about said axis and positioned opposite each other;
said tubular member having at least one first slit therein, extending circumferentially about said central axis, and at least two longitudinally extending second slits;
said first set of first structural portions and said second set of said second structural portions surrounding said central axis and said central opening;
the second structural portions of said second set being located at opposite circumferential sides of said at least one first slit on opposite sides of said tubular member;
the first structural portions of said first set being located at opposite longitudinal sides of each of said second slits;
the overall longitudinal extent of one of said first set and said second set including all of the longitudinal extent of the other of said first set of said second set.

2. A thrust-torque detector, comprising:
a tubular member having a longitudinally extending central axis, opposite end surfaces, and a central longitudinally extending opening, said tubular member including;
parallel first spring-like elastically supported structural portions, deformable by an axial thrust force, positioned opposite each other, and
radially extending second spring-like elastically supported structural portions, deformable by a torque about said axis, positioned opposite each other;
said tubular member having at least one first slit therein, extending circumferentially about and parallel to said central axis, and at least two longitudinally extending second slits;
said first structural portions and said second structural portions surrounding said central axis and said central opening;
said second structural portions being located at opposite circumferential sides of said at least one first slit on opposite side of said tubular member;
said first structural portions being located at opposite longitudinal sides of each of said second slits;
the longitudinal extent of each of said first structural portions being coextensive with respective segments of the longitudinal extent of said second structural portions.

3. A thrust-torque detector as in claim 2, wherein said second slits comprise parallel planar slits extending parallel said central axis, having opposite sides adjacent respective ones of said end surfaces so as to define said first structural portions between said opposite end surfaces and said opposite sides of said second slits.

4. A thrust-torque detector as in claim 2, wherein said first and second structural portions are located in alternating relation about the circumference of said tubular member, said detector further comprising thrust detecting elements and torque detecting elements, respectively connected to said first and second structural portions circumferentially in alternating relation about said tubular member.

5. At thrust-torque detector as in claim 2, wherein said tubular member has four longitudinally extending grooves, each having side surfaces, at equal intervals about the circumference of said tubular member, said at least one first slit including two first slits, each located between and having opposite sides adjacent to respective ones of the side surfaces of adjacent ones of said grooves, opening at opposite ends of said grooves at said opposite end surfaces, said second slits opening at opposite ends thereof into said side surfaces of said grooves.

6. A thrust-torque detector as in claim 5, wherein said first structural portions are located on first opposite sides of said tubular member at both sides of said second slits so as to define said first structural portions between said opposite end surfaces and opposite sides of said second slits, and said second structural portions are located on second opposite sides of said tubular member between said first opposite sides at opposite sides of said two first slits, said second structural portions being defined between said opposite sides of said first slits and said respective ones of said slide surfaces of said adjacent ones of said grooves.

7. A thrust-torque detector, comprising a tubular member having a longitudinally extending central axis, opposite end surfaces, and a longitudinally extending opening, said tubular member having four longitudinally extending grooves having side surfaces, equally spaced about the circumference of said tubular member, first circumferentially and longitudinally extending slits between adjacent ones of said grooves opening at opposite ends in said opposite end surfaces so as to define between peripheral surfaces of said tubular member and the interior of said first slits in diametrically opposing pairs, radially extending spring-like elastically supported structural torque portions deformable by a torque about said axis, and second longitudinally extending planar slits opening at opposite ends in respective ones of said side surfaces of said grooves so as to define between opposite sides of said second slits and said opposite end surfaces of said tubular member in diametrically oppositely positioned pairs, parallel spring-like elastically supported structural thrust portions, deformable by an axial thrust force.

8. A thrust-torque detector as in claim 7, wherein said structural torque portions are located on first diametrically opposite sides of said tubular member at both sides of said first slits, between said both sides of said first slits and respective side surfaces of said adjacent ones of said grooves, and said structural thrust portions are located on second diametrically opposite sides of said tubular member at both sides of said second slits between said both sides of said second slits and respective end surfaces of said tubular member;

said structural thrust portions are located on second diametrically opposite sides of said tubular member between said first diametrically opposite sides of said tubular member.

* * * * *